(12) United States Patent
Nguyen et al.

(10) Patent No.: US 11,268,366 B2
(45) Date of Patent: Mar. 8, 2022

(54) METHODS OF STRENGTHENING AND CONSOLIDATING SUBTERRANEAN FORMATIONS WITH SILICATE-ALUMINUM GEOPOLYMERS

(71) Applicant: Halliburton Energy Services, Inc., Houston, TX (US)

(72) Inventors: Philip D. Nguyen, Houston, TX (US); Tatyana V. Khamatnurova, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 318 days.

(21) Appl. No.: 16/305,242

(22) PCT Filed: Jul. 7, 2016

(86) PCT No.: PCT/US2016/041356
§ 371 (c)(1),
(2) Date: Nov. 28, 2018

(87) PCT Pub. No.: WO2018/009199
PCT Pub. Date: Jan. 11, 2018

(65) Prior Publication Data
US 2020/0048530 A1 Feb. 13, 2020

(51) Int. Cl.
*C09K 8/57* (2006.01)
*C09K 8/80* (2006.01)
(Continued)

(52) U.S. Cl.
CPC ............ *E21B 43/267* (2013.01); *C09K 8/572* (2013.01); *C09K 8/80* (2013.01); *C09K 8/665* (2013.01); *C09K 2208/28* (2013.01)

(58) Field of Classification Search
None
See application file for complete search history.

(56) References Cited

U.S. PATENT DOCUMENTS

| 5,925,598 | A | 7/1999 | Mody et al. |
| 8,889,602 | B2 | 11/2014 | Cliffe |

(Continued)

FOREIGN PATENT DOCUMENTS

| EP | 2231812 B1 | 4/2015 |
| WO | 2015/088536 A1 | 6/2015 |

OTHER PUBLICATIONS

International Search Report and Written Opinion issued in related PCT Application No. PCT/US2016/041356 dated Apr. 7, 2017, 11 pages.

(Continued)

*Primary Examiner* — Anuradha Ahuja
(74) *Attorney, Agent, or Firm* — Thomas Rooney; Baker Botts L.L.P.

(57) ABSTRACT

Systems and methods for treating fracture faces and/or unconsolidated portions of a subterranean formation are provided. In some embodiments, the methods comprise: providing an aqueous alkali solution; introducing the aqueous alkali solution into at least a portion of a subterranean formation that comprises one or more fractures; contacting an aluminum component and a silicate component with the aqueous alkali solution to form a geopolymer on one or more fracture faces in the fractures; and placing a plurality of proppant particulates in the fractures.

20 Claims, 2 Drawing Sheets

(51) Int. Cl.
*C09K 8/66* (2006.01)
*E21B 43/267* (2006.01)

(56) References Cited

U.S. PATENT DOCUMENTS

| | | | |
|---|---|---|---|
| 9,212,304 B2 | 12/2015 | McDonald | |
| 2005/0274516 A1* | 12/2005 | Nelson | C09K 8/572 |
| | | | 166/276 |
| 2006/0113080 A1* | 6/2006 | Nguyen | C09K 8/665 |
| | | | 166/308.1 |
| 2007/0114032 A1* | 5/2007 | Stegent | C09K 8/56 |
| | | | 166/287 |
| 2008/0058576 A1* | 3/2008 | Shafer | C02F 9/00 |
| | | | 588/300 |
| 2008/0110624 A1* | 5/2008 | Nguyen | C09K 8/508 |
| | | | 166/281 |
| 2010/0022418 A1* | 1/2010 | Milne | C09K 8/602 |
| | | | 507/217 |
| 2011/0284223 A1 | 11/2011 | Porcherie et al. | |
| 2012/0260829 A1* | 10/2012 | Pershikova | C04B 12/005 |
| | | | 106/804 |
| 2012/0267106 A1 | 10/2012 | Pershikova et al. | |
| 2012/0305247 A1* | 12/2012 | Chen | E21B 43/267 |
| | | | 166/280.1 |
| 2013/0233623 A1 | 9/2013 | Aston et al. | |
| 2013/0341024 A1* | 12/2013 | Fonseca | E21B 43/261 |
| | | | 166/281 |
| 2014/0076568 A1* | 3/2014 | McDonald | C01B 33/26 |
| | | | 166/305.1 |
| 2014/0321925 A1 | 10/2014 | Landis et al. | |
| 2014/0342156 A1 | 11/2014 | Seo et al. | |
| 2015/0083414 A1 | 3/2015 | Monroe et al. | |
| 2015/0083417 A1 | 3/2015 | Lant et al. | |
| 2015/0114640 A1* | 4/2015 | Bestaoui-Spurr | C09K 8/805 |
| | | | 166/280.2 |
| 2016/0153274 A1* | 6/2016 | Hull | E21B 43/267 |
| | | | 166/280.2 |
| 2019/0264095 A1* | 8/2019 | Qu | C09K 8/518 |

OTHER PUBLICATIONS

Van Oort, Eric, et al. "Silicate-based drilling fluids: competent, cost-effective and benign solutions to wellbore stability problems." SPE/IADC Drilling Conference. Society of Petroleum Engineers, 1996.

Abdullah, M. M. A., et al. "Mechanism and chemical reaction of fly ash geopolymer cement—A review." Int. J. Pure Appl. Sci. Technol 6.1 (2011): 35-44.

Davidovits, Joseph. "Geopolymers: inorganic polymeric new materials ." Journal of Thermal Analysis and calorimetry 37.8 (1991): 1633-1656 (Reprint).

\* cited by examiner

METHODS OF STRENGTHENING AND CONSOLIDATING SUBTERRANEAN FORMATIONS WITH SILICATE-ALUMINUM GEOPOLYMERS

CROSS-REFERENCE TO RELATED APPLICATION

The present application is a U.S. National Stage Application of International Application No. PCT/US2016/041356 filed Jul. 7, 2016, which is incorporated herein by reference in its entirety for all purposes.

BACKGROUND

The present disclosure relates to systems and methods for treating subterranean formations.

Wells in hydrocarbon-bearing subterranean formations are often stimulated to produce those hydrocarbons using hydraulic fracturing treatments. In hydraulic fracturing treatments, a viscous fracturing fluid, which also functions as a carrier fluid, is pumped into a producing zone at a rate and pressure such that one or more fractures are formed in the zone. In order to maintain sufficient conductivity through the fracture, it is often desirable that the formation surfaces within the fracture or "fracture faces" be able to resist erosion and/or migration to prevent the fracture from narrowing or fully closing. Typically, proppant particulates suspended in a portion of the fracturing fluid are also deposited in the fractures when the fracturing fluid is converted to a thin fluid to be returned to the surface. These proppant particulates serve to prevent the fractures from fully closing so that conductive channels are formed through which produced hydrocarbons can flow. However, loose proppant particulates deposited within a fracture may become displaced from their location by the flow of produced fluids through the fracture.

Hydrocarbon wells are also often located in subterranean formations that contain unconsolidated particulates, such as sand, gravel, fines, etc., in addition to proppant particulates. Unconsolidated particulates may migrate out of the subterranean formation into a well bore and/or may be produced with the oil, gas, water, and/or other fluids produced by the well. The flowback of such particulates, in produced fluids is undesirable in that the particulates may abrade pumping and other producing equipment, clog portions of the well bore, and otherwise hinder the production of desired fluids from the well. Unconsolidated particulates may include any loose particulates and particulates bonded with insufficient bond strength to withstand the forces created by the production of fluids through the formation.

One method used to treat fracture faces and/or control unconsolidated particulates in subterranean formations involves the application of a resin or tackifying agent to the fracture face and/or unconsolidated particulates. The resin or tackifying agent may consolidate unconsolidated particulates into stable, permeable masses, and or may help stabilize the fracture face. However, certain resins and tackifying agents may comprise certain chemical components (e.g., certain solvents, amides, amines, etc.) that may pose certain environmental and/or safety risks, or may be prohibitively expensive for certain applications.

Another method of controlling unconsolidated particulates in subterranean formations involves placing a filtration bed containing gravel (e.g., a "gravel pack") near the well bore to present a physical barrier to the transport of unconsolidated particulates and sands with the production of desired fluids. However, gravel packs may be time consuming and expensive to install, and it is often difficult to determine an appropriate screen size to use as formation sand and particulates tend to have a wide distribution of grain sizes.

BRIEF DESCRIPTION OF THE DRAWINGS

These drawings illustrate certain aspects of some of the embodiments of the present disclosure, and should not be used to limit or define the claims.

Figure 1:
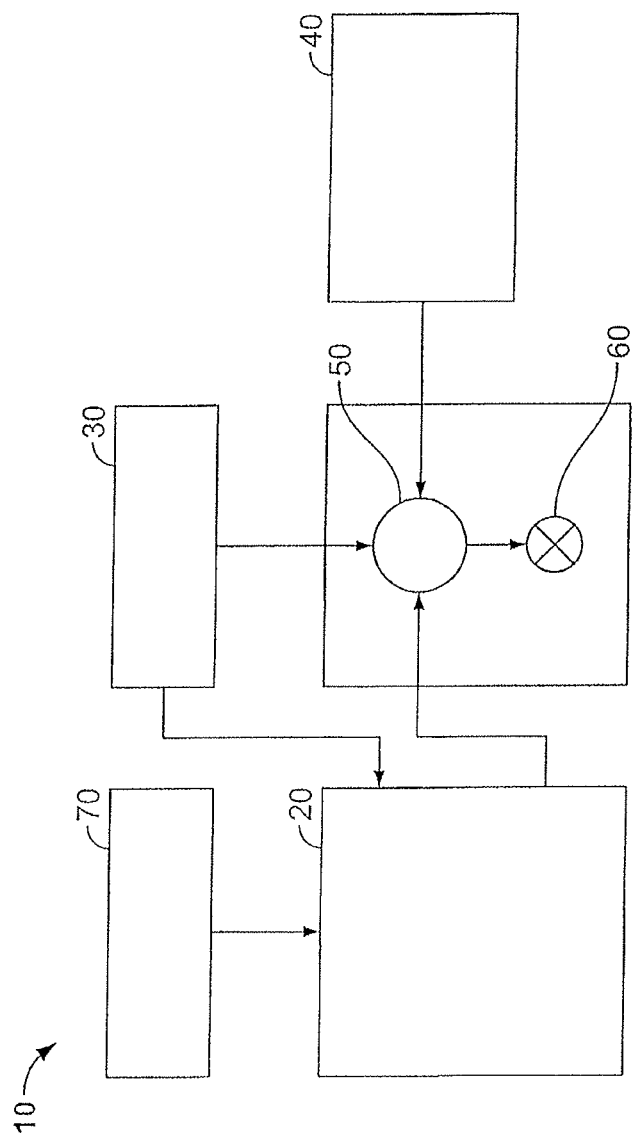
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating subterranean formations. More particularly, the present disclosure relates to systems and methods for treating fracture faces and/or unconsolidated portions of a subterranean formation.

The present disclosure provides methods and systems for strengthening fracture faces and strengthening and/or consolidating unconsolidated particulates within a subterranean formation by forming by forming geopolymer networks in the formation via chemical reactions between aluminum and silicate components in the presence of an alkaline solution. The methods of the present disclosure generally comprise providing an aqueous alkali solution and contacting an aluminum component and a silicate component with the aqueous alkali solution in a subterranean formation to form a geopolymer therein. One or both of the aluminum and/or silicate components may be naturally occurring or otherwise present within the subterranean formation prior to treatment, or may be introduced into the subterranean formation in the course of the treatment (e.g., as a component of a treatment fluid). The geopolymer may form a coating or otherwise become deposited on one or more surfaces within the subterranean formation, which may serve one or more functions. In some embodiments, the geopolymer may be deposited on a fracture face in a formation, which may, among other benefits, protect that fracture face from erosion, degradation, or other undesirable interactions. In certain embodiments, the geopolymer (either by itself or in conjunction with other materials) may form ridges, bumps, patches, or an uneven film on the fracture face that may, among other benefits, further assist in maintaining the conductivity of the fracture. In some embodiments, the geopolymer may be formed in a portion of a subterranean formation comprising loose or unconsolidated particulates in a manner that at least partially consolidates a portion of those particulates. In some embodiments, the methods and compositions of the present disclosure may be used to treat particulates that have been partially consolidated by another substance (e.g., a resin or tackifying agent), and the treatments disclosed herein may be used to strengthen the consolidation between such particulates in a portion of the formation.

Without limiting the disclosure to any particular theory or mechanism, geopolymer networks are believed to be formed by the poly-condensation or polymerization of silicon and aluminum hydroxide (e.g., formed when silicates and/or aluminosilicates are dissolved in an alkali solution) at ambient or slightly elevated temperatures to form an insoluble poly(silicon-oxo-aluminate) network, also referred to as polysialates. The geopolymer molecules may take the form of $SiO_4$ and $AlO_4$ tetrahedra that share oxygen atoms and have the following chemical structures.

    poly(sialate)

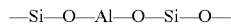    poly(sialate-siloxo)

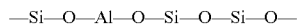    poly(sialate-disiloxo)

One or more cations such as $Na^+$, $Ca^{2+}$, $Mg^{2+}$, $Al^{3+}$, $Fe^{3+}$, $K^+$, $Li^+$, $Ba^{2+}$, $H_3O^+$, and the like may coordinate with these molecules to balance the negative charges in the tetrahedra to form a stable framework. In some embodiments, the geopolymers formed in this manner may comprise solid, rigid, and/or generally insoluble structures that may exhibit high strength and/or rigidity, and may have an amorphous, three-dimensional structure similar to that of aluminosilicate glass. It is believed that the poly-condensation or polymerization interactions will occur to form a geopolymer network at temperatures naturally occurring in subterranean formations, although in some instances the formation optionally may be heated to initiate and/or accelerate these interactions. In some embodiments, a suitable temperature range in which to initiate the formation of these geopolymers may range from about 20° C. to about 300° C., or in some embodiments, from about 60° C. to about 200° C., or in some embodiments, at about 150° C.

Among the many potential advantages to the methods and compositions of the present disclosure, only some of which are alluded to herein, the methods, compositions, and systems of the present disclosure may strengthen fracture faces and/or consolidated particulates in a formation. The strengthening of fracture faces may, among other benefits, reduce or prevent sloughing and/or migration of formation materials from the fracture face, reduce or prevent proppant embedment in the fracture face under closure stresses, and/or help maintain the conductivity of fractures (e.g., microfractures) in the formation. The consolidation of particulates and/or strengthening of consolidated particulates in a formation may, among other benefits, reduce or prevent particulate flowback in a wellbore, help maintain the conductivity of a producing region of a formation, and/or reduce or prevent abrasion damage to equipment. In some embodiments, the methods and compositions of the present disclosure may provide consolidation and fracture face treatments that are safer, more environmentally acceptable, and/or less expensive as compared to other methods and compositions used for those treatments. For example, in some embodiments, the methods and compositions of the present disclosure may provide treatments for strengthening fracture faces and/or consolidating particulates in a formation that are substantially free of functionalized amines, which may be prohibitively expensive and/or less environmentally acceptable in some circumstances.

The silicate component may comprise any compound containing an anionic silicon component, which may include silicates such as silicon oxides (e.g., silica ($SiO_2$)), metal silicates, silicon halides, silicon hydroxide, and the like. The aluminum component may comprise any compound that can dissociate to form aluminum ions, which may include aluminum oxides (e.g., $Al_2O_3$), phosphates, sulfates, hydroxides, halides, nitrates, and the like. In some embodiments, the aluminum component and/or silicate component may be provided as an aluminosilicate such as an aluminosilicate oxide or an inorganic aluminosilicate salt (e.g., sodium aluminosilicate, calcium aluminosilicate, etc.). Sources of aluminum oxide and/or silicate oxides may include, but are not limited to fly ash, clays, zeolites, metakaolin, andalusite, kyanite, and sillimanite, and the like.

The silicate component and the aluminum component may be provided or present in any amounts and/or ratios suitable for a particular application of the present disclosure. In certain embodiments where the silicate component and the aluminum component are provided in a treatment fluid with an alkali solution, those components may react to form a sol-gel, which may have a relatively high viscosity. In these embodiments, it may be desirable or necessary to include those components in a treatment fluid (e.g., the alkali solution) in a sufficiently dilute concentration such that the fluid can be pumped into the subterranean formation using standard pumping wellbore equipment. In some embodiments, the physical properties of the geopolymer (e.g., strength, hardness, etc.) may depend at least in part on the ratio of silica and aluminum in the geopolymer, which may be controlled by controlling the amounts of silicate component and/or aluminum components present in or introduced into the subterranean formation. In some embodiments, the molar ratio of $SiO_2:Al_2O_3$ in the geopolymer may range from about 1:1 to about 30:1. In some embodiments, the molar ratio of $SiO_2:Al_2O_3$ in the geopolymer may range from about 1:1 to about 6:1. In some embodiments, the molar ratio of $SiO_2:Al_2O_3$ in the geopolymer may be about 2:1.

The aqueous alkali solutions used in the methods and systems of the present disclosure may comprise any aqueous base fluid known in the art. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may comprise water from any source, and may comprise any components other than water that do not adversely impact the alkali solution, silicate component, and/or aluminum components used in the particular application of the present disclosure. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate.

The aqueous alkali solution comprises an alkali source, which may comprise any alkali metal or alkaline earth metal known in the art, including lithium, sodium, potassium, calcium, magnesium, and the like. In some embodiments, the alkali metal may be provided in the form of an alkali metal hydroxide (e.g., NaOH, KOH, $Ca(OH)_2$, $Mg(OH)_2$, etc.), alkali halide (e.g., KCl, NaCl, etc.) or an alkali metal oxide (e.g., $Na_2O$, $K_2O$, etc.) that is dissolved in an aqueous fluid. The aqueous alkali solution may be of any concentration that does not adversely interact with other components in the treatment solution or subterranean formation. In some embodiments, the concentration of the alkali in the aqueous solution may be from about 5% to about 50% by weight. The appropriate concentration of the aqueous alkali solution also may be a function of the amount of the silicate component that it activates to form the geopolymer. In some embodiments, the molar ratio of the silicate component to the alkali metal hydroxide or alkali metal oxide may range from about 0.1:1 to about 6:1. In some embodiments, the molar ratio of the silicate component to the alkali metal hydroxide or alkali metal oxide may range from about 0.67:1 to about 2:1. In some embodiments, the molar ratio of the silicate component to the alkali metal hydroxide or alkali metal oxide may be about 1:1.

In certain embodiments, the aqueous solutions and/or other treatment fluids used in the methods and systems of the present disclosure optionally may comprise any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, viscosifying/gelling agents, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

In certain embodiments, the aqueous solutions and/or other treatment fluids used in the methods and systems of the present disclosure optionally may comprise one or more proppant particulates, among other reasons, to be placed within fractures in the formation. In some embodiments, a plurality of proppant particulates may reside and/or be deposited in a fracture treated according to the methods of the present disclosure using another treatment fluid. Generally, the proppant particulates in the methods and systems of the present disclosure do not comprise and are different and separate from the geopolymer formed by the interaction of the aluminum and silicate components of the present disclosure. In some embodiments, the proppant particulates may be placed within a fracture after the geopolymer is formed on one or more fracture faces in the fracture. Examples of materials that may be suitable for use as proppant particulates in certain embodiments of the present disclosure include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. In certain embodiments, the proppant particulates may have an average size larger than that of micro-proppant particulates (discussed below), and may range from greater than about 100 mesh, U.S. Sieve Series.

In certain embodiments, the aqueous solutions and/or other treatment fluids used in the methods and systems of the present disclosure optionally may comprise one or more microproppant materials, among other reasons, to be placed within microfractures in the formation. Such microproppant materials may comprise particulates that are pumped into the formation with a carrier fluid, or may comprise particulates formed in situ in the formation. In some embodiments, such microproppant particulates may have an average size of less than about 100 mesh. In certain embodiments, the microproppant particulates may have particle sizes smaller than 100 mesh (149 μm), and in certain embodiments may have particle sizes equal to or smaller than 200 mesh (74 μm), 230 mesh (63 μm) or even 325 mesh (44 μm). Examples of microproppant materials that may be suitable for use in certain embodiments of the present disclosure include, but are not limited to, fly ash, silica, alumina, fumed carbon, carbon black, graphite, mica, titanium dioxide, metal-silicate, silicate, kaolin, talc, zirconia, boron, hollow microspheres, glass, calcined clays, partially calcined clays, and any combination thereof. In certain embodiments, microproppant materials may become anchored and/or adhered to fracture faces within the microfracture (e.g., wherein the geopolymer network acts as a binder to form a solid mass for anchoring the microproppant to the fracture face), which may produce solid masses in the forms of high strength ridges, bumps, patches, or an uneven film on the fracture face. This may, among other benefits, further assist in maintaining the conductivity of the microfractures.

The treatment fluids and/or aqueous solutions of the present disclosure may be prepared using any suitable method and/or equipment (e.g., blenders, mixers, stirrers, etc.) known in the art at any time prior to their use. The fluids may be prepared at least in part at a well site or at an offsite location. In certain embodiments, the alkali solution, silicate component, aluminum component, and/or other components of the fluid may be metered directly into a base fluid to form the fluid or solution. In certain embodiments, a base fluid may be mixed with the alkali solution, silicate component, aluminum component, and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the fluids of the present disclosure may be prepared, either in whole or in part, at an offsite location and transported to the site where the treatment or operation is conducted. In introducing a fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The present disclosure provides methods for using the treatment fluids to carry out subterranean treatments in conjunction with a variety of subterranean operations, including but not limited to, hydraulic fracturing operations, acidizing operations (e.g., matrix acidizing or fracture acidizing), consolidation operations, and the like. In certain embodiments, a treatment fluid may be introduced into a subterranean formation. In some embodiments, the treatment fluid may be introduced into a well bore that penetrates a subterranean formation. The subterranean formations treated may comprise any type of rock, including but not limited to sandstone, shale, carbonate, coal, shale muds, laminated sand/shale, and any combination thereof.

In certain embodiments involving fracturing treatments, a treatment fluid may be introduced at a pressure sufficient to create or enhance one or more fractures within the subterranean formation (e.g., hydraulic fracturing). In certain embodiments, the treatment fluid introduced at a pressure sufficient to create or enhance one or more fractures within the formation may comprise one or more of the alkali solution, silicate component, and/or aluminum component. The balance of those three components that are not provided in the treatment fluid (if any) may already be present in the portion of the subterranean formation. Thus, in certain embodiments, the methods may comprise the steps of providing a treatment fluid that comprises one or more of the aqueous alkali solution, the aluminum component, and/or the silicate component (the latter two of which may be provided as an aluminosilicate) and introducing the treatment fluid into at least portion of a subterranean formation at or above a pressure sufficient to create or enhance at least one fracture in the subterranean formation. In certain of these embodiments, a portion of the treatment fluid may coat at least a portion of one or more fracture faces of the newly-created fracture, and the geopolymer may be formed on one or more of the fracture faces. In certain of these embodiments, the treatment fluid optionally may comprise, for example, a viscosifying agent, a friction reducer, and/or one or more proppant particulates, the latter of which may be deposited within one or more of the newly-created fractures.

In other embodiments, the methods and compositions of the present disclosure may be used to treat pre-existing fractures, or fractures created using a different treatment fluid. In certain of these embodiments, a treatment fluid comprising none of the components listed above may be introduced at a pressure sufficient to create or enhance one or more fractures within the formation, and one or more of the aqueous alkali solution, silicate component, and/or aluminum component subsequently may be introduced into the formation. The balance of those three components that are not provided in the treatment fluid (if any) may already be present in the portion of the subterranean formation. In certain of these embodiments, a portion of the treatment fluid may coat at least a portion of one or more fracture faces of a previously-created fracture, and the geopolymer may be formed on one or more of the fracture faces.

In certain embodiments, the methods and compositions of the present disclosure may be used to create or enhance and treat microfractures within a subterranean formation in fluid communication with a primary fracture in the formation. In certain embodiments, these microfractures may be pre-existing microfractures, and may be treated in a similar manner to those discussed above. In other embodiments, a treatment fluid of the present disclosure comprising one or more of the aqueous alkali solution, the silicate component, and/or aluminum component may be introduced into a subterranean formation at or above a pressure sufficient to create one or more micro fractures. The balance of those three components that are not provided in the treatment fluid (if any) may already be present in the portion of the subterranean formation. In these embodiments, the treatment fluid optionally may comprise one or more microproppant materials, among other reasons, to be deposited within microfractures in the formation. In certain embodiments, a first treatment fluid comprising one or more of an aqueous alkali solution, a silicate component, and/or an aluminum component (and, optionally, a viscosifying agent, friction reducer, and/or one or more microproppant materials), may be introduced into the subterranean formation at a pressure sufficient to create or enhance one or more fractures in the formation, followed by a second treatment fluid comprising one or more of an aqueous alkali solution, a silicate component, and/or an aluminum component (and, optionally, a viscosifying agent, friction reducer, and/or a plurality of proppant particulates) that is introduced into the subterranean formation. The aqueous alkali solutions, silicate components, and/or aluminum components in the first and second treatment fluids may have the same chemical composition, or may have different compositions. The first treatment fluid may enter one or more microfractures created within the formation, the components of which may form a geopolymer on fracture faces within the microfractures. Additionally, the microproppant material carried in the first fluid may be deposited within the microfractures and/or may become anchored or adhered to fracture faces within the microfractures to form ridges, bumps, patches or an uneven film on that fracture face. The second treatment fluid may enter the larger, primary fracture, the components of which may form a geopolymer on fracture faces within the primary fracture. Additionally, the proppant particulates carried in the second fluid may be deposited in the primary fracture. In certain embodiments where a first and second treatment fluid are used in this manner, the first treatment fluid may include a higher concentration of the alkali, aluminum component and/or the silicate component as compared to the second treatment fluid, among other reasons, because the surface area of fracture faces to be treated within the microfractures may be greater than that of the fracture faces within the primary fracture.

In certain embodiments, at least a portion of the treatment fluid (e.g., a portion of the treatment fluid coating a fracture face) that comprises the aqueous alkali solution, silica component, and/or aluminum component optionally may be heated, among other reasons, to initiate or accelerate the polymerization and/or poly-condensation reactions that form the geopolymer. In these embodiments, the treatment fluid may be heated prior to, during, and/or after its introduction into the subterranean formation. Any equipment suitable for heating a subterranean treatment fluid may be used, including but not limited to: heaters installed in the tanks, mixing equipment, and/or pumping equipment used to mix and/or pump the treatment fluid; downhole heating equipment installed in the casing or well bore; in-line heaters; tankless heaters; microwave devices (e.g., attached to a coiled tubing); etc. In some embodiments, the treatment fluid may be heated by naturally-occurring heat sources in the subterranean formation. In some embodiments, the treatment fluid may be heated to a temperature of from about 20° C. to about 300° C., or in some embodiments, from about 60° C. to about 200° C., or in some embodiments, at about 150° C.

In certain embodiments involving a consolidation treatment, the methods and compositions of the present disclosure may be used to at least partially consolidate loose particulates in a formation such as sands, gravel, clays, fines, and/or proppant particulates, or increase the consolidation strength of such particulates that have already been partially consolidated (e.g., in a previous consolidation treatment). In these embodiments, a treatment fluid comprising one or more of an aqueous alkali solution, a silicate component, and/or an aluminum component may be introduced into a portion of the subterranean formation comprising the particulates, and the balance of those three components that are not provided in the treatment fluid (if any) may already be present in the portion of the subterranean formation. The geopolymer as described above may form a coating or otherwise become deposited onto the surfaces of the particulates and may form a hardened consolidated mass that comprises the geopolymer and the particulates intermingled therewith. This consolidated mass may, among other benefits, reduce or prevent the migration, flowback, or other movement of the particulates when fluid is produced or flowed out of the formation.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments that involve fracturing treatments or the treatment of pre-existing fractures. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant (e.g., microproppant material or larger proppant particulates) for combination with the fracturing fluid. The system may also include additive source 70 that provides one or more additives (e.g., the silicate components, aluminum components, and/or alkali sources according to the present disclosure, as well as gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
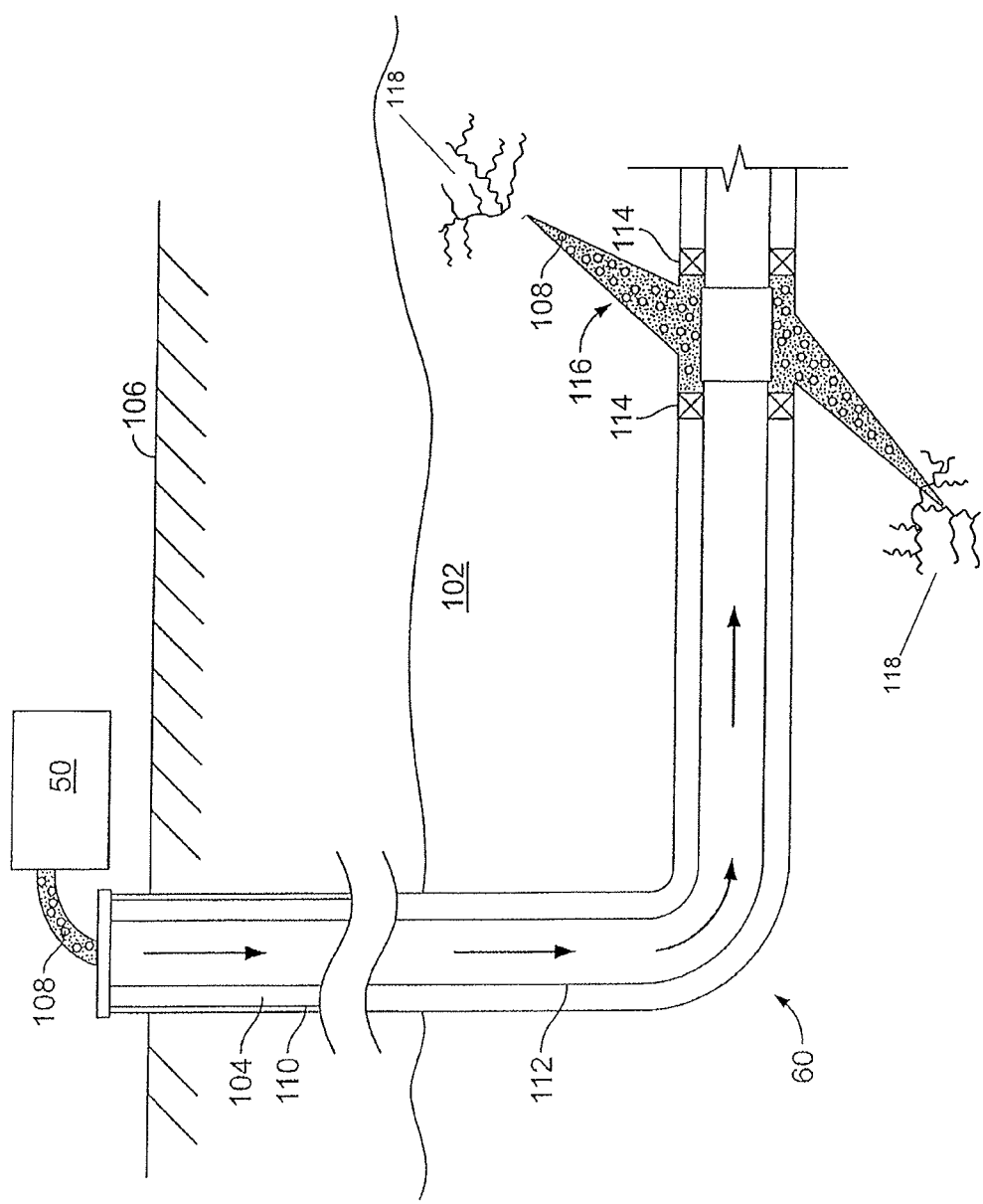
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. In certain embodiments, the fracturing fluid 108 may include one or more of an aqueous alkali solution, a silicate component, and/or an aluminum component, which may facilitate the formation of geopolymers on the fracture faces within fractures 116 according to the methods described therein. The proppant particulates in the fracturing fluid 108 may enter the fractures 116 where they may remain after the fracturing fluid flows out of the well bore. These proppant particulates may "prop" fractures 116 such that fluids may flow more freely through the fractures 116. Additionally, one or more microfractures 118 branching off of and in communication with fractures 116 may be created in a similar fashion. In certain embodiments, the fracturing fluid 108 may include one or more of an aqueous alkali solution, a silicate component, and/or an aluminum component, which may facilitate the formation of geopolymers on the fracture faces within microfractures 118 according to the methods described therein.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLE

A treatment fluid sample comprising an aluminosilicate (fly ash), sodium metasilicate ($Na_2SiO_3$), and potassium chloride was applied to Ohio sandstone wafers in order to test the effectiveness and performance of the methods of the present disclosure. The treatment fluid was mixed and spread onto half of a wafer. Once the solution was applied, the wafer was placed in an oven at 100° C. for 4 hours, after which the wafer was removed and allowed to cool. Scratch tests were performed on the treated and untreated half of the wafer to evaluate the toughness of these surfaces. The results indicated that the toughness of the surface treated using the compositions of the present disclosure was much higher than that of the untreated surface.

An embodiment of the present disclosure is a method comprising: providing an aqueous alkali solution; introducing the aqueous alkali solution into at least a portion of a subterranean formation that comprises one or more fractures; contacting an aluminum component and a silicate component with the aqueous alkali solution to form a geopolymer on one or more fracture faces in the fractures; and placing a plurality of proppant particulates in the fractures.

Another embodiment of the present disclosure is a system comprising: providing a first treatment fluid that comprises a first aqueous alkali solution, a first aluminum component, and a first silicate component; providing a second treatment fluid that comprises a second aqueous alkali solution, a second aluminum component, a second silicate component, and a plurality of proppant particulates; introducing the first treatment fluid and the second treatment into at least a portion of a subterranean formation, at least one of which being introduced at or above a pressure sufficient to create or enhance at least one fracture and at least one microfracture in the subterranean formation, the fracture and the microfracture each comprising one or more fracture faces; placing the plurality of proppant particulates in the fracture; and forming a geopolymer on the fracture faces of the microfracture and of the fracture.

Another embodiment of the present disclosure is a method comprising: providing an aqueous alkali solution; introducing the aqueous alkali solution into at least a portion of a subterranean formation that comprises a plurality of at least partially unconsolidated particulates; and contacting an aluminum component and a silicate component with the aqueous alkali solution to form a geopolymer in contact with the partially unconsolidated particulates to form a consolidated mass.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing an aqueous alkali solution;
introducing the aqueous alkali solution into at least a portion of a subterranean formation;
forming a film comprising a geopolymer on one or more fracture faces in one or more fractures in the subterranean formation by contacting an aluminum component and a silicate component with the aqueous alkali solution; and
placing a plurality of proppant particulates in the one or more fractures.

2. The method of claim 1 wherein the aqueous alkali solution is introduced into the subterranean formation at or above a pressure sufficient to create or enhance the one or more fractures in the subterranean formation, the one or more fractures comprising the one or more fracture faces in the subterranean formation.

3. The method of claim 1 wherein the aqueous alkali solution further comprises one or both of the aluminum component and the silicate component.

4. The method of claim 1 wherein the aluminum component and the silicate component are provided as an aluminosilicate.

5. The method of claim 4 wherein the aluminosilicate comprises fly ash.

6. The method of claim 1 wherein the aqueous alkali solution further comprises at least a portion of the plurality of proppant particulates.

7. The method of claim 1 wherein the portion of the subterranean formation comprising the one or more fracture faces is at a temperature of from about 20° C. to about 300° C.

8. The method of claim 1 wherein the one or more fractures comprise one or more microfractures.

9. The method of claim 8 wherein the proppant particulates comprise a microproppant material.

10. The method of claim 1, further comprising allowing the film to strengthen the one or more fracture faces.

11. The method of claim 1, further comprising introducing a treatment fluid comprising the aluminum component and the silicate component into at least the portion of the subterranean formation.

12. The method of claim 11, wherein the treatment fluid is introduced continuously during a fracturing operation.

13. The method of claim 1, wherein the aqueous alkali solution further comprises a friction reducer.

14. The method of claim 1, wherein the aqueous alkali solution further comprises a viscosifying agent.

15. The method of claim 1, wherein the aqueous alkali solution is introduced into the subterranean formation using one or more pumps.

16. The method of claim 1, wherein the one or more fractures comprise one or more microfractures and the the proppant particulates comprise a microproppant material.

17. The method of claim 1, wherein the aluminum component and the silicate component are provided as an aluminosilicate and the aqueous alkali solution further comprises a friction reducer.

18. A method comprising:
providing an aqueous alkali solution;
introducing the aqueous alkali solution into at least a portion of a subterranean formation;
forming a film comprising a geopolymer on one or more fracture faces in one or more fractures in the subterranean formation by contacting an aluminum component and a silicate component with the aqueous alkali solution;
placing a plurality of proppant particulates in the one or more fractures; and
allowing the film to at least partially protect the one or more fracture faces from erosion and degradation.

19. The method of claim 18 wherein the aqueous alkali solution is introduced into the subterranean formation at or above a pressure sufficient to create or enhance the one or more fractures in the subterranean formation, the one or more fractures comprising the one or more fracture faces in the subterranean formation.

20. The method of claim 18 wherein the aqueous alkali solution further comprises one or both of the aluminum component and the silicate component.

* * * * *